May 18, 1965     H. KETTNER     3,183,700
DEVICE FOR REMOVING THE BURR FROM SLOTTED BOLT HEADS
Filed July 19, 1961
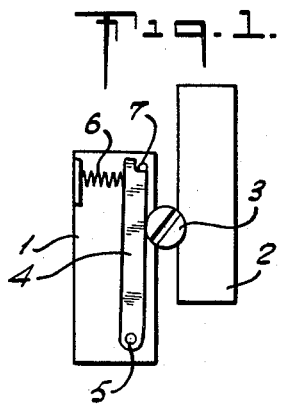
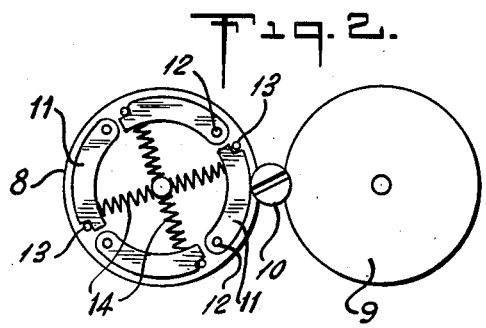
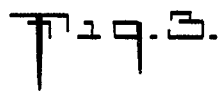
INVENTOR
HANS KETTNER

United States Patent Office 3,183,700
Patented May 18, 1965

1

3,183,700
DEVICE FOR REMOVING THE BURR FROM SLOTTED BOLT HEADS
Hans Kettner, Tambach-Dietharz, Germany, assignor to VEB Schrauben- und Nietewerke Tambach, Tambach-Dietharz, Germany
Filed July 19, 1961, Ser. No. 126,848
5 Claims. (Cl. 72—71)

This invention relates to a device for removing burrs which are produced during the slotting of bolt and screw heads, and is more particularly concerned with a device which is connectable to a thread rolling machine and which is provided with a grinding surface adapted to engage the circumferential surface of the slotted heads.

It is a common practice to provide the heads of bolts and screws with slots. During the operation of milling or rolling slots into the heads of bolts or screws, small flanges or burrs are produced particularly at the points of the bolt heads where the cuts or slots penetrate the circumferential surfaces of the bolt heads. In order to produce a bolt or screw with a finished head, it is desirable to remove the burr produced during the slotting operation so that the bolt or screw complies more fully with commercial requirements and technical specifications.

The known burr removing devices have the inherent drawback that the material removed in slotting the bolt head is mixed with the cooling or lubricating medium and has the tendency of entering between the driving elements of the burr removing device in the form of very fine chips or shavings. The presence of these metal shavings between the often complex moving parts of the slotting apparatus or machine causes considerable wear which reduces the productive life of the machine to a substantial degree and necessitates repeated repairs.

The present invention provides a device which is connected to a thread rolling or milling machine, by means of which the bolt heads may be finished or de-burred during the thread rolling operation in a satisfactory manner without any detrimental effect on the combined milling assembly.

According to the invention the device or tool for removing the burrs of a slotted bolt head is connectable to the thread rolling apparatus or machine regardless of whether the latter forms the milling operation in a rectilinear or rotary process, such that the circumferential surface of the bolt head is caused to slide along a surface of the burr removing device which is roughened similar to a file and which has a profile corresponding to the form of the bolt head. This file-like grinding surface of the burr removing device slides along the circumferential surface of the bolt head as the bolt shaft is rolled between the milling dies during the thread rolling operation. The grinding surface of the tool according to the invention is urged against the bolt head by means of a resilient biasing arrangement so that the circumferential portion of the bolt head makes several complete revolutions in engagement with the de-burring device or tool during the burr removing operation.

It is, therefore, no object of this invention to provide a burr removing tool which is associated with a thread rolling or milling machine and in which the shavings produced during the slotting of the bolt heads do not penetrate between the moving parts of either the burr removing or the thread milling machinery.

It is another object of this invention to provide a burr removing tool for a thread rolling machine which is adapted to either a rectilinear or a rotary operation of the machine.

It is a further object of this invention to provide a burr removing tool which is of simple construction and of dependable operation and which reduces the cost of manufacture of bolts and screws having finished head.

Other objects of the invention and the features of novelty will be apparent from the following description taken in conjunction with the accompanying drawings in which:

FIG. 1 shows the burr removing tool associated with a rectilinearly operating thread rolling machine;

FIG. 2 shows the burr removing tool of the invention associated with a rotary thread rolling machine; and FIG. 3 shows different profile faces of the burr removing surface of the tool according to the invention.

Referring now more particularly to FIG. 1 of the drawing in which the burr removing tool is associated with a thread rolling machine with rectilinearly moving cutting dies or jaws, a shank of the bolt which is or has been provided with a thread is rotated between jaws 1 and 2 of the thread rolling machine and simultaneously a head 3 of the bolt to be threaded slides along a burr removing tool 4. This burr removing tool is pivotally mounted on the jaw 1 of the thread rolling machine by a pin 5 and is urged by a spring 6 against an abutment stop 7. This biasing arrangement provides a uniform operating pressure of the entire burr removing tool against the bolt head 3 and effects the complete removal of the burr which projects at the ends of the slot.

Referring now more particularly to FIG. 2 of the drawing it will be observed that a burr removing tool 11 of this embodiment is associated with a thread rolling machine in which the dies execute a rotary movement. The bolt shank is threaded between milling rollers 8 and 9 and the bolt head 10 slides along a burr removing tool section 11. Regardless of whether the milling rollers 8 and 9 thread one or more bolt shanks in a single revolution, the burr removing tool is preferably formed of several spaced annularly disposed tool sections 11.

Each of these burr removing tool sections 11 is pivotally mounted on milling roller 8 by means of a bolt 12 and urged by a biasing spring 14 against an abutment or stop 13. This arrangement provides again a positive pressure force of each of the burr removing tool sections 11 against the bolt head 10 so that the removal of the burr on the periphery of the bolt head is assured. It will be observed that the pressure force of the spring members against the individual burr removing tools either of the arrangement disclosed in FIG. 1 or the arrangement shown in FIG. 2 may be adjusted in any suitable manner (not shown).

Referring now more particularly to FIG. 3 of the drawing it will be observed that independently of the type of thread rolling process, whether rectilinear or rotary, the burr removing surface or face 15, 15', 15" of the tool may be given a cross-sectional profile which corresponds to the form of the bolt head from which the burr is to be removed. In this manner the device of the invention is adapted to remove the burr independently of the shape of the bolt head or of the cut of the slot and of the type of thread rolling process employed conforming in each case to standard specification or keeping within a permissible tolerance while the burr or the material constituting the burr will not come in contact with the moving parts of the thread rolling machine.

While a specific embodiment of the invention has been shown and described in detail to illustrate the application of the invention principles, it will be understood that the invention may be embodied otherwise without departing from such principles.

What is claimed is:

1. A bolt burr removing device comprising at least two spaced-apart rotatable means forming bolt rotating means adapted to rotate a bolt placed therebetween by its shank, and rotatable burr removing means pivotally mounted on one of said rotatable means adapted to engage the head of said bolt projecting beyond the edge of said rotatable means, said burr removing means including at least two segmented members peripherally arranged with respect to the rotatable means upon which they are mounted.

2. Apparatus in accordance with claim 1 wherein said burr removing means includes abutment means and means for resiliently biasing said segmented members into engagement with said projecting bolt head.

3. In a bolt burr removing device having two spaced-apart thread rolling means in the form of two circular dies and adapted to rotate a bolt therebetween by its shank, and at least the die forming said one rolling means being rotated during the thread rolling operation, the improvement comprising, burr removing means for engaging the head of said bolt projecting beyond the edge of said one rolling means including at least two arcuate members peripherally arranged on said die of said one rolling means, and pivot means for attaching said arcuate members to said die.

4. Apparatus according to claim 3 further including abutment means on said die forming said one rolling means for limiting the outward movement of said arcuate members and means for resiliently biasing said arcuate members into engagement with said projecting bolt head.

5. A combined burr removing device and threading machine comprising at least two spaced apart rotatable dies forming thread rolling means adapted to rotate a bolt placed therebetween by its shank, and burr removing means pivotally mounted on one of said dies adapted to engage the head of said bolt; said burr removing means including at least one arcuate member peripherally arranged with respect to its mounting die.

References Cited by the Examiner

UNITED STATES PATENTS

| 1,296,154 | 3/19 | Atchison | 10—6 |
| 1,625,332 | 4/27 | Potter | 80—8 |
| 2,269,168 | 1/42 | Ure | 10—87 |
| 2,852,788 | 9/58 | Putetti | 10—6 |

FOREIGN PATENTS 591,245  1/34  Germany.

WILLIAM J. STEPHENSON, *Primary Examiner.*

EDWARD C. ALLEN, *Examiner.*